(12) United States Patent
Tessien (10) Patent No.: US 7,677,790 B2
(45) Date of Patent: Mar. 16, 2010

(54) FLUID ROTATION SYSTEM FOR A CAVITATION CHAMBER

(75) Inventor: Ross Alan Tessien, Nevada City, CA (US)

(73) Assignee: Impulse Devices, Inc., Grass Valley, CA (US)

( * ) Notice: Subject to any disclaimer, the term of this patent is extended or adjusted under 35 U.S.C. 154(b) by 1077 days.

(21) Appl. No.: 11/038,344

(22) Filed: Jan. 18, 2005

(65) Prior Publication Data

US 2006/0159556 A1 Jul. 20, 2006

(51) Int. Cl.
  *B01F 11/00* (2006.01)
(52) U.S. Cl. .................. 366/108; 366/114; 366/293
(58) Field of Classification Search ............ 366/108, 366/114, 115, 124, 127, 273, 274, 293
  See application file for complete search history.

(56) References Cited

U.S. PATENT DOCUMENTS

| | | | | | |
|---|---|---|---|---|---|
| 2,376,221 | A | * | 5/1945 | Baker | 95/30 |
| 2,386,493 | A | * | 10/1945 | Moresco | 99/621 |
| 2,556,854 | A | * | 6/1951 | Spears et al. | 310/104 |
| 3,051,457 | A | * | 8/1962 | Rice | 366/293 |
| 3,214,149 | A | * | 10/1965 | Budzien | 261/29 |
| 3,614,069 | A | * | 10/1971 | Murry | 366/119 |
| 3,744,763 | A | * | 7/1973 | Schnoring et al. | 366/178.1 |
| 4,333,796 | A | | 6/1982 | Flynn | |
| 4,563,341 | A | | 1/1986 | Flynn | |
| 5,176,446 | A | * | 1/1993 | Chiba et al. | 366/114 |

(Continued)

FOREIGN PATENT DOCUMENTS

WO  PCT/US95/15972  7/1996

(Continued)

OTHER PUBLICATIONS

Blake et al, Acoustic Cavitation:The Fluid Dynamics of Non-Spherical Bubbles, Phil. Trans. R. Soc. Lond. A, 1999, pp. 251-267, vol. 357, Publisher: The Royal Society, Published in: Great Britain.

(Continued)

*Primary Examiner*—David L Sorkin
(74) *Attorney, Agent, or Firm*—C. Brandon Browning; Maynard, Cooper & Gale, P.C.

(57) ABSTRACT

A system for achieving bubble stability within a cavitation chamber is provided. The system includes an impeller assembly, the impeller assembly having at least one impeller located within the cavitation chamber. A motor, coupled to the impeller by a drive shaft, rotates the impeller thereby causing bubbles within the cavitation chamber to move toward the impeller's axis of rotation. As a consequence, the bubbles become more stable. Preferably the axis of rotation of the impeller is positioned in a substantially horizontal plane, thus allowing the rotating impeller to counteract the tendency of the bubbles to drift upward and to accumulate on the upper, inner surfaces of the cavitation chamber. The impeller can be rotated continuously throughout the cavitation process or stopped prior to cavitating the bubbles within the cavitation chamber. In the latter scenario, the impeller can be stopped, and if desired locked, at a specific rotational position, thus minimizing possible interference between the impeller and the source of the cavitation energy. The impeller can be shaped to correspond to the inner surface of the cavitation chamber, for example spherically or cylindrically, and can utilize multiple impeller blades.

4 Claims, 12 Drawing Sheets

U.S. PATENT DOCUMENTS

| | | | |
|---|---|---|---|
| 5,659,173 | A | 8/1997 | Putterman et al. |
| 5,858,104 | A | 1/1999 | Clark |
| 6,386,751 | B1 * | 5/2002 | Wootan et al. ........... 366/170.3 |
| 6,627,784 | B2 * | 9/2003 | Hudson et al. ............. 588/320 |
| 2002/0090047 | A1 | 7/2002 | Stringham |
| 2003/0044442 | A1 * | 3/2003 | Stanier et al. .............. 424/401 |
| 2004/0191707 | A1 * | 9/2004 | Mitsui et al. ............... 430/567 |

FOREIGN PATENT DOCUMENTS

| | | |
|---|---|---|
| WO | WO 01/39199 A2 * | 5/2001 |
| WO | PCT/CA03/00342 | 9/2003 |

OTHER PUBLICATIONS

M. Dan et al., Ambient Pressure Effect on Single-Bubble Sonoluminescence, Physical Review Letters, Aug. 30, 1999, pp. 1870-1873, vol. 83, No. 9, Publisher: The Amencan Physical Society, Published in: US.

Moss et al., Computed Optical Emissions from a Sonoluminescing Bubble, Physical Review E, Mar. 1999, pp. 2986-2992, vol. 59, No. 3, Published in: US.

Gaitan et al, Experimental Observations of Bubble Response and Light Intensity Near the Threshold for Single Bubble Sonoluminescence, Physical Review E, May 1999, pp. 5495-5502, vol. 59, No. 5, Published in: US.

Barber et al, Sensitivity of Sonoluminescence to Experimental Parameters, Physical Review Letters, Feb. 28, 1994, pp. 1380-1382, vol. 72, No. 9.

Putterman, Sonoluminescence:Sound Into Light, Scientific American, Feb. 1995, pp. 46-51.

Gaitan et al, Sonoluminescence and Bubble Dynamics for a Single, Stable, Cavitation Bubble, J. Acoust. Soc. Am., Jun. 1992, pp. 3166-3183, vol. 91, No. 6, Publisher: Acoustical Society of America.

Crum, Sonoluminescence, Physics Today, Sep. 1994, pp. 22-29, Publisher: American Institute of Physics, Published in: US.

A. Chakravarty et al., Stable Sonoluminescence Within a Water Hammer Tube, Physical Review E, Jun. 24, 2004, pp. 1-8, vol. 69, No. 066317, Publisher: The American Physical Society, Published in: US.

Bollinger, Ultra Cavitation, http://wiretap.area.com/Gopher/Library/Article/Sci/cavitate.ult, Sep. 17, 2001, pp. 1-26.

* cited by examiner

FLUID ROTATION SYSTEM FOR A CAVITATION CHAMBER

FIELD OF THE INVENTION

The present invention relates generally to cavitation systems and, more particularly, to a system for stabilizing bubbles within a cavitation chamber via fluid rotation.

BACKGROUND OF THE INVENTION

Sonoluminescence is a well-known phenomena discovered in the 1930's in which light is generated when a liquid is cavitated. Although a variety of techniques for cavitating the liquid are known (e.g., spark discharge, laser pulse, flowing the liquid through a Venturi tube), one of the most common techniques is through the application of high intensity sound waves.

In essence, the cavitation process consists of three stages; bubble formation, growth and subsequent collapse. The bubble or bubbles cavitated during this process absorb the applied energy, for example sound energy, and then release the energy in the form of light emission during an extremely brief period of time. The intensity of the generated light depends on a variety of factors including the physical properties of the liquid (e.g., density, surface tension, vapor pressure, chemical structure, temperature, hydrostatic pressure, etc.) and the applied energy (e.g., sound wave amplitude, sound wave frequency, etc.).

Although it is generally recognized that during the collapse of a cavitating bubble extremely high temperature plasmas are developed, leading to the observed sonoluminescence effect, many aspects of the phenomena have not yet been characterized. As such, the phenomena is at the heart of a considerable amount of research as scientists attempt to further characterize the phenomena (e.g., effects of pressure on the cavitating medium) as well as its many applications (e.g., sonochemistry, chemical detoxification, ultrasonic cleaning, etc.). By-products of this research have been several patents claiming various aspects of the process. One such patent, U.S. Pat. No. 4,333,796, discloses a cavitation chamber that is generally cylindrical although the inventors note that other shapes, such as spherical, can also be used. It is further disclosed that the chamber is comprised of a refractory metal such as tungsten, titanium, molybdenum, rhenium or some alloy thereof. U.S. Pat. No. 4,333,796 states that the temperatures achieved by a collapsing bubble depend strongly on whether or not the interface of the bubble and the host liquid remain spherical during collapse. Noting that the earth's gravitational field is an asymmetric force that can cause bubble deformation, the patent discloses that a preferred cavitation chamber includes means for applying a magnetic field to cancel the gravitational force, thus creating a zero-gravity field within the cavitation zone. U.S. Pat. No. 4,333,796 further discloses that if the bubble is cylindrical or quasi-cylindrical, small surface perturbations will neither grow nor decay. The patent discloses several means of achieving such a bubble shape, including imposing a time-varying magnetic field. U.S. Pat. No. 4,563,341, a continuation-in-part of U.S. Pat. No. 4,333,796, discloses the use of a vertical standing pressure wave excited by a transducer in the bottom wall of the chamber as a means of reducing the effects of the earth's gravitational field within the cavitation zone.

U.S. Pat. No. 5,659,173 discloses a sonoluminescence system that uses a transparent spherical flask. The spherical flask is not described in detail, although the specification discloses that flasks of Pyrex®, Kontes®, and glass were used with sizes ranging from 10 milliliters to 5 liters. U.S. Pat. No. 5,659,173 does not disclose any means for stabilizing bubbles within the cavitation zone.

U.S. Pat. No. 5,858,104 discloses a shock wave chamber partially filled with a liquid. The remaining portion of the chamber is filled with gas which can be pressurized by a connected pressure source. Acoustic transducers mounted in the sidewalls of the chamber are used to position an object within the chamber. Another transducer mounted in the chamber wall delivers a compressional acoustic shock wave into the liquid. A flexible membrane separating the liquid from the gas reflects the compressional shock wave as a dilatation wave focused on the location of the object about which a bubble is formed.

PCT WO 03/077260 discloses a nuclear fusion reactor in which a bubble of fusionable material is compressed using an acoustic pulse, the compression of the bubble providing the necessary energy to induce nuclear fusion. The nuclear fusion reactor is spherically shaped and filled with a liquid such as molten lithium or molten sodium. To form the desired acoustic pulse, a pneumatic-mechanical system is used in which a plurality of pistons associated with a plurality of air guns strike the outer surface of the reactor with sufficient force to form a shock wave within the reactor's liquid. The application discloses releasing the bubble at the bottom of the chamber and applying the acoustic pulse as the bubble passes through the center of the reactor. A number of methods of determining when the bubble is approximately located at the center of the reactor are disclosed. The application also discloses that a bubble positioning system may be used, the system comprised of two pairs of jets which flow the liquid within the reactor inwardly, thereby directing the bubble towards the center of the vessel.

PCT WO 96/21230 discloses a non-periodically forced bubble fusion apparatus. The apparatus is comprised of a liquid-filled pressure vessel into which deuterium gas bubbles are injected. A non-periodic pressure field is generated within the liquid, the pressure field causing the bubbles to oscillate and become compressed thereby heating the bubbles to a temperature which is sufficiently high to cause a fusion reaction in the hot deuterium plasma formed at implosion stagnation. The application does not disclose any means of stabilizing the movement of the injected bubbles or positioning the bubbles within the pressure vessel.

In a paper entitled *Sonoluminescence and Bubble Dynamics for a Single, Stable, Cavitation Bubble* (J. Acoust. Soc. Am. 91 (6), June 1992), Felipe Gaitan et al. modeled the motion of acoustically driven bubbles based on the results of their single bubble experiments. The authors' experimental apparatus included a liquid filled levitation cell in which a stationary acoustic wave was excited, the stationary wave counteracting the hydrostatic or buoyancy force, thus stabilizing a bubble injected into the cell and allowing it to remain suspended in the liquid indefinitely.

Avik Chakravarty et al., in a paper entitled *Stable Sonoluminescence Within a Water Hammer Tube* (Phys Rev E 69 (066317), Jun. 24, 2004), investigated the sonoluminescence effect using a water hammer tube rather than an acoustic resonator, thus allowing bubbles of greater size to be studied. The experimental apparatus employed by the authors included a sealed water hammer tube partially filled with the liquid under investigation. The water hammer tube was mounted vertically to the shaft of a moving coil vibrator. Cavitation was monitored both with a microphone and a photomultiplier tube. To stabilize the bubbles within the water hammer tube and minimize the effects of the tube walls, in one embodiment the tube was rotated about its axis.

Although a variety of sonoluminescence systems have been designed, typically these systems suffer from a variety of shortcomings due to the inherent instability of the cavitating bubbles. The present invention overcomes these shortcomings by providing a system for stabilizing the cavitating bubbles within the cavitation chamber.

SUMMARY OF THE INVENTION

The present invention provides a system for achieving bubble stability within a cavitation chamber. The system includes an impeller assembly, the impeller assembly having at least one impeller located within the cavitation chamber. A motor, coupled to the impeller by a drive shaft, rotates the impeller thereby causing bubbles within the cavitation chamber to move toward the impeller's axis of rotation. As a consequence, the bubbles become more stable. Preferably the axis of rotation of the impeller is positioned in a substantially horizontal plane, thus allowing the rotating impeller to counteract the tendency of the bubbles to drift upward and to accumulate on the upper, inner surfaces of the cavitation chamber. Associated with the cavitation chamber is at least one cavitation driver. If desired, a cavitation fluid circulatory system can be coupled to the cavitation chamber.

In at least one embodiment of the invention the impeller is rotated continuously throughout the cavitation process. Alternately, impeller rotation can be stopped prior to cavitating the bubbles within the cavitation chamber. In this instance the impeller can be stopped, and if desired locked, at a specific rotational position, thus minimizing possible interference between the impeller and the source of the cavitation energy.

In at least one embodiment of the invention, both the cavitation chamber and the impeller are cylindrically shaped. In an alternate embodiment, both the cavitation chamber and the impeller are spherically shaped.

In at least one embodiment of the invention, the impeller assembly is comprised of a two-bladed impeller. Alternate embodiments use impellers with different numbers of blades. The primary constraint placed on impeller configuration is to minimize turbulence which may result as the impeller blade(s) moves through the cavitation fluid.

A further understanding of the nature and advantages of the present invention may be realized by reference to the remaining portions of the specification and the drawings.

DESCRIPTION OF THE SPECIFIC EMBODIMENTS

Figure 1:
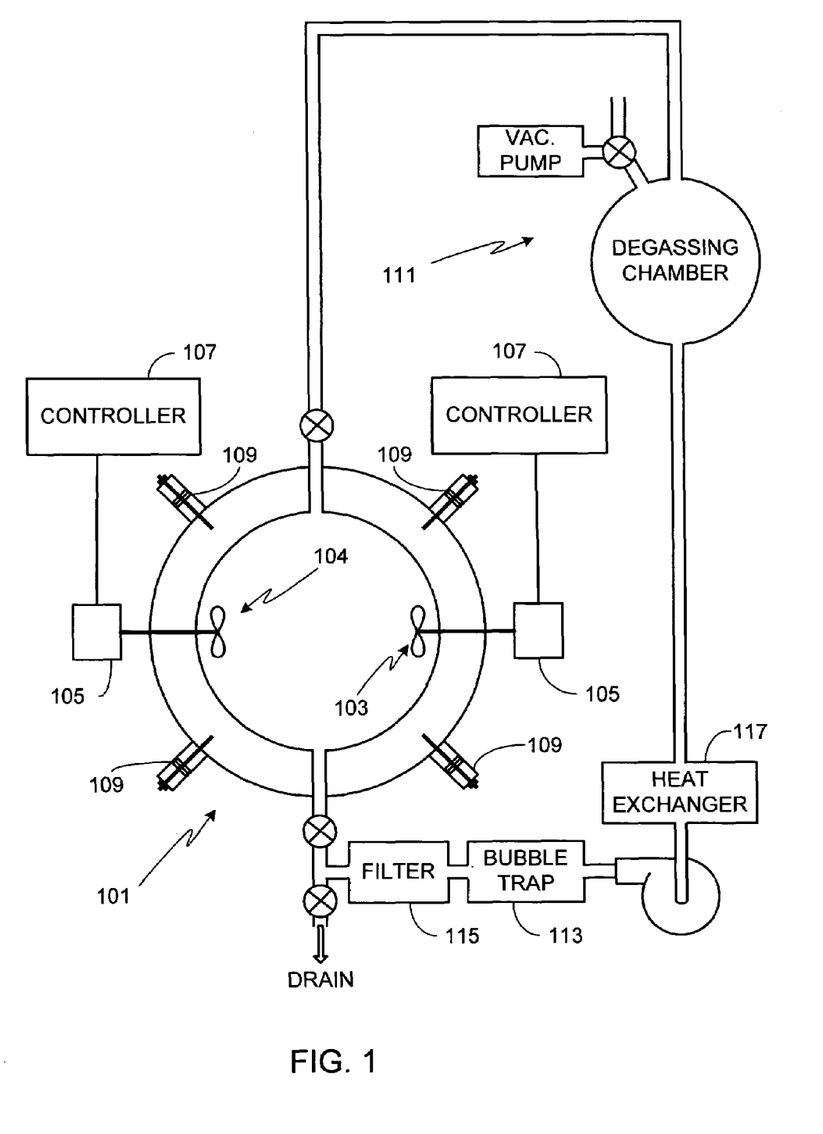
FIG. 1 is a conceptual illustration of the principal elements of the invention implemented in an exemplary embodiment.

FIG. 1 is a conceptual illustration of the principal elements of the invention implemented in an exemplary embodiment. More specifically, the invention is fitted within a sonoluminescence cavitation chamber 101, hereafter referred to as simply a cavitation chamber. The invention uses at least one impeller 103, and in at least one embodiment a pair of impellers 103/104, to stabilize and axially center bubbles within the cavitation chamber. If a pair of impellers is used, preferably the axes of the two impellers are coaxial as shown. Each impeller shaft is attached to a motor 105 and a motor controller 107. It will be appreciated that in the description that follows unless a specific embodiment is being discussed with a particular impeller arrangement, the general description refers to both single impeller and multiple impeller embodiments.

Impeller 103, alternately impellers 103/104, serve many purposes. First, the impeller(s) helps to keep the cavitating bubbles away from the inner chamber surfaces. Second, the impeller(s) centers the bubble or bubbles along the impeller's axis. Therefore if the impeller axis is maintained in a horizontal plane, as preferred, the impeller's rotation can be used to overcome the bubble's tendency to drift upward through the chamber. This benefit is especially important if larger bubbles are used in the cavitation process. Third, by locating the bubbles in a known position through the use of the impeller(s), the means used to drive energy into the cavitation chamber can be designed to more efficiently couple the driving energy into the cavitating bubble. Fourth, the impeller(s) can be used to improve the sphericity of the bubbles during the cavitation process, in particular during the period of cavitation in which the bubbles are collapsing. As a result, smaller bubble diameters can be achieved prior to bubble deformation or disintegration.

It will be appreciated that the present invention, i.e., a means of rotating the cavitation fluid within a cavitation chamber, is not limited to a particular outside chamber diameter, inside chamber diameter, chamber material or chamber shape (e.g., cylindrical chambers, spherical chambers, rectangular chambers, etc.). Such information, as provided herein, is only meant to provide exemplary chamber configurations for which the present invention is applicable. Similarly, the invention is not limited to the acoustic drivers 109 shown in FIG. 1, rather the invention can be used with any of a variety of cavitation driver types, numbers or mounting locations. Similarly, the invention is not limited to a specific system configuration, i.e., the invention can be used with a sealed chamber or a chamber in which the cavitation fluid passes through a circulatory system as shown in FIG. 1. If a circulatory system is used, it may or may not include a degassing system 111, and/or a bubble trap 113, and/or a filter 115 and/or a heat exchange system 117. If a circulatory system is used, the chamber inlet and outlet locations as well as the selected cavitation fluid flow rate are preferably designed to minimize disruption of cavitation fluid rotation. Typically the cavitation fluid is degassed (e.g., of air) prior to initiating cavitation, and typically before initiating impeller rotation.

Figure 2:
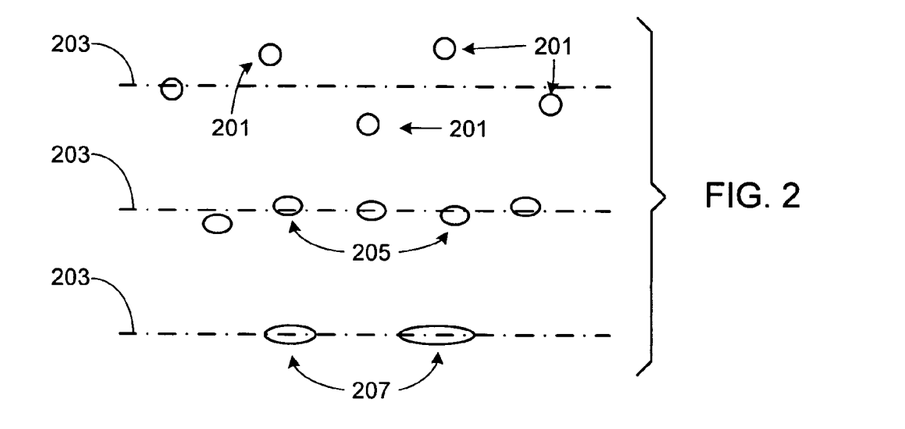
FIG. 2 illustrates the effects of cavitation fluid rotation on a plurality of bubbles contained within a cavitation chamber.

FIG. 2 illustrates some of the primary shapes associated with bubble rotation. Initially, immediately after the impeller(s) starts to rotate and assuming a relatively low impeller rotation velocity, bubbles 201 are drawn toward the rotational axis 203. During this stage of rotation and with low rotation velocities, the bubbles remain roughly spherical in shape as the force exerted by the rotating fluid is insufficient to overcome the bubbles' tendency to assume a spherical shape, thereby minimizing the bubble's surface tension. As the rotational velocity increases, the bubbles 205 are drawn more forcefully towards the rotational axis 203. Simultaneously, bubbles 205 begin to elongate as illustrated. At this stage typically there is a 'string' of bubbles formed along the rotational axis, the sphericity of each of the bubbles depending strongly on the rotational velocity of the fluid. If the bubbles are sufficiently large, or the rotational velocity sufficiently high, often multiple bubbles will coalesce into larger, elongated bubbles 207, the number and size of bubbles 207 depending upon the number of bubbles, their sizes, and the rotational velocity. Whether the bubbles are vapor filled (evacuated) or gas filled, their behavior is substantially the same. Of course other factors such as fluid pressure and composition also determine the sphericity of the bubbles for a given rotational velocity.

As previously noted, the degree to which the bubble(s) is centered along the fluid's axis of rotation as well as the degree to which the bubble(s) is elongated depends on the fluid rotation velocity and the length of time that the fluid has been rotated. Additionally impeller rotation can either be continuous or non-continuous. The inventor has found that continuous impeller rotation is best employed when the drivers are comprised of acoustic drivers, and non-continuous impeller rotation is best when it is desirable to place (and if desired, lock) the impeller blades at a specific location prior to initiating cavitation implosions. It will be appreciated that other factors, such as the desired bubble shape or location, can also influence whether impeller rotation should be continuous or non-continuous.

Figure 3:
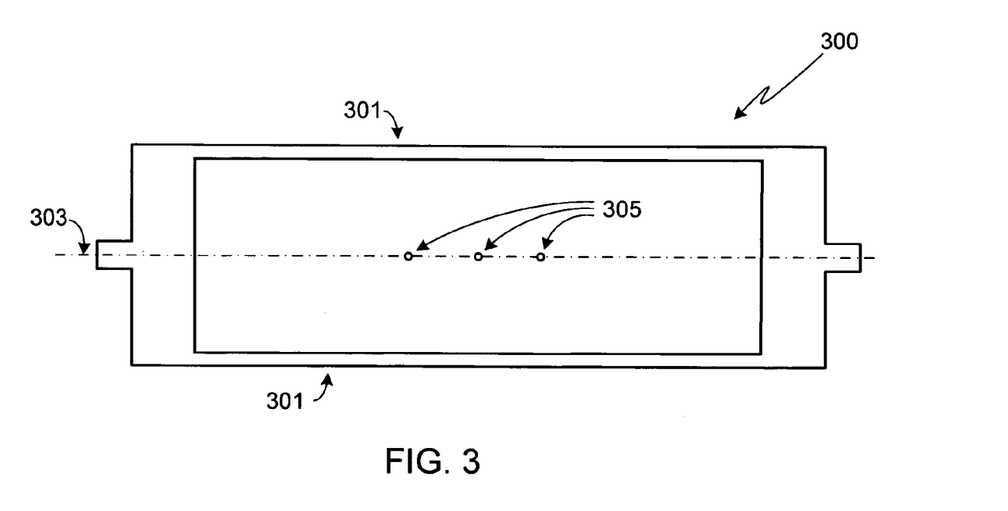
FIG. 3 illustrates a specific bubble geometry with a few small bubbles within a cylindrical impeller.
Figure 4:
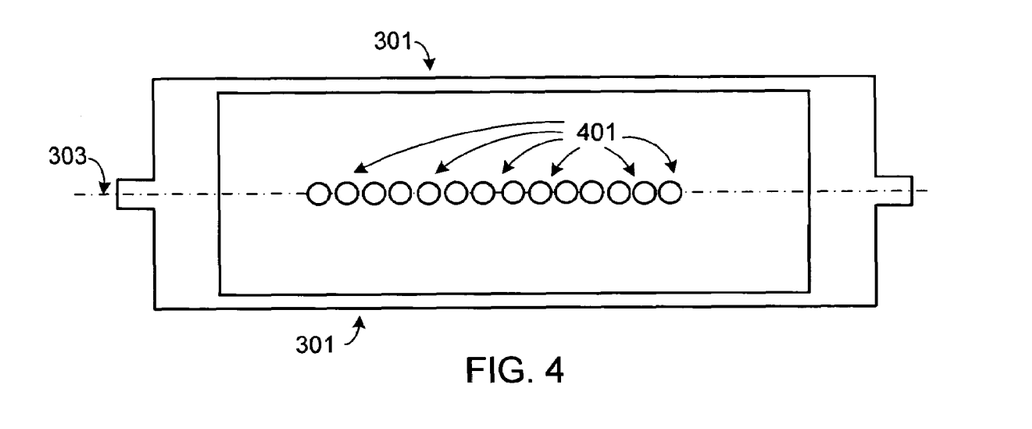
FIG. 4 illustrates a relatively large number of bubbles within a cylindrical cavity prior to bubble collapse.
Figure 5:
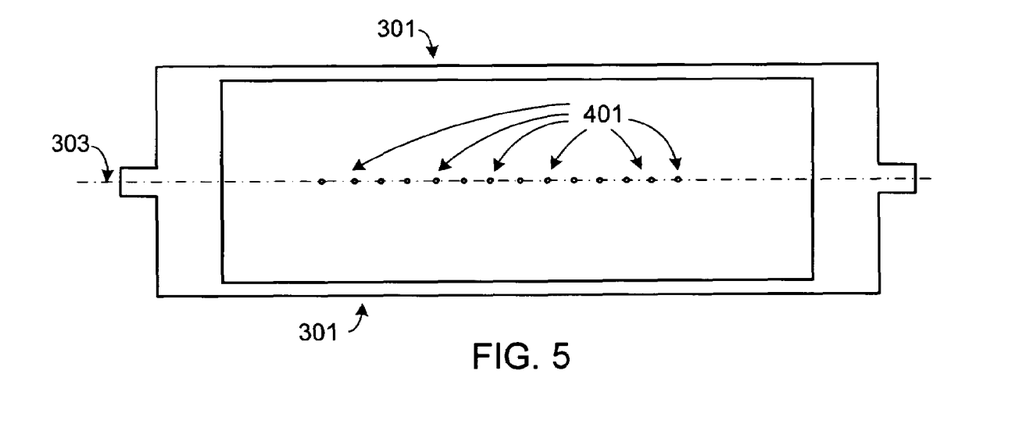
FIG. 5 illustrates the bubbles of FIG. 4 during bubble collapse.
Figure 6:
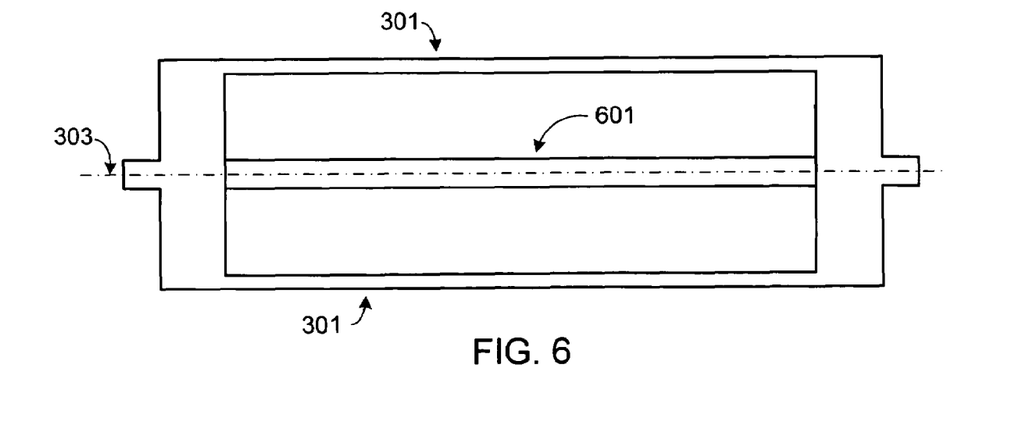
FIG. 6 illustrates one, extremely large cylindrical bubble within a cylindrical cavity prior to bubble collapse.
Figure 7:
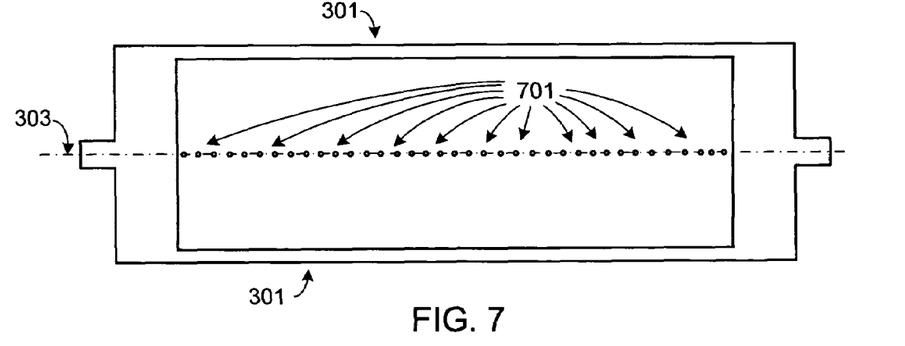
FIG. 7 illustrates the degeneration of the cylindrical bubble of FIG. 6 during bubble collapse.

The inventor has found that depending upon bubble density (i.e., number) and bubble size (i.e., bubble volume), impeller rotation can be used to generate a variety of different bubble geometries. FIGS. 3-7 illustrate three such geometries. For purposes of illustration, these bubble geometries are shown within a cylindrical impeller 300 comprised of a pair of impeller blades 301, the impeller axis of rotation 303 located in a horizontal plane. FIG. 3 illustrates a few (e.g., three) small bubbles 305 held along axis 303. FIGS. 4 and 5 illustrate a large number of relatively large volume bubbles 401 before (i.e., FIG. 4) and during (i.e., FIG. 5) bubble collapse. FIG. 6 illustrates one, extremely large cylindrical bubble 601 prior to collapse. During collapse (i.e., FIG. 7), bubble 601 degenerates into a plurality of small bubbles 701.

As previously noted, a variety of different bubble geometries can be achieved by varying the impeller rotation velocity, selecting either continuous or non-continuous impeller rotation, and controlling the bubble density and bubble volume. Additionally it will be appreciated that other parameters such as impeller design and cavitation fluid composition affect the bubble geometry. With respect to composition, the two primary attributes of the selected cavitation medium which control the response of a bubble to the rotating impeller(s) is the medium's viscosity and surface tension. Increasing the viscosity of the cavitation medium affects the ease by which the impeller(s) can rotate within the fluid as well as the rate at which bubbles can move within the fluid, both during impeller rotation and after cessation of impeller rotation. The surface tension affects how quickly a bubble undergoes elongation in response to impeller rotation.

Figure 8:
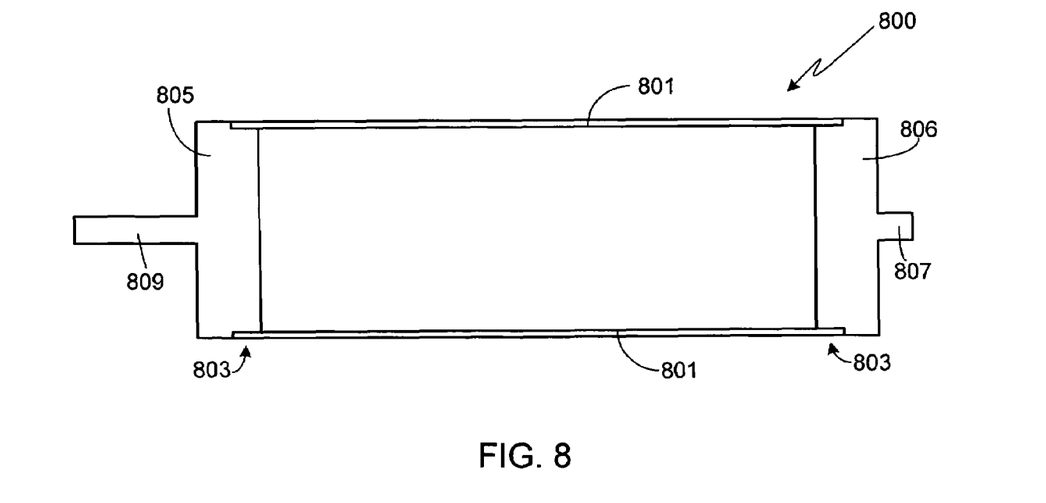
FIG. 8 is a cross-sectional view of a preferred impeller design for use with a cylindrical cavitation chamber.
Figure 9:
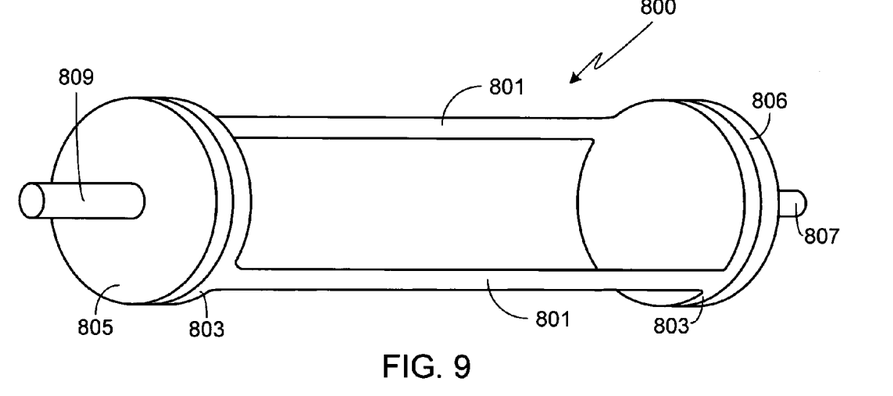
FIG. 9 is a perspective view of the impeller shown in FIG. 8.
Figure 10:
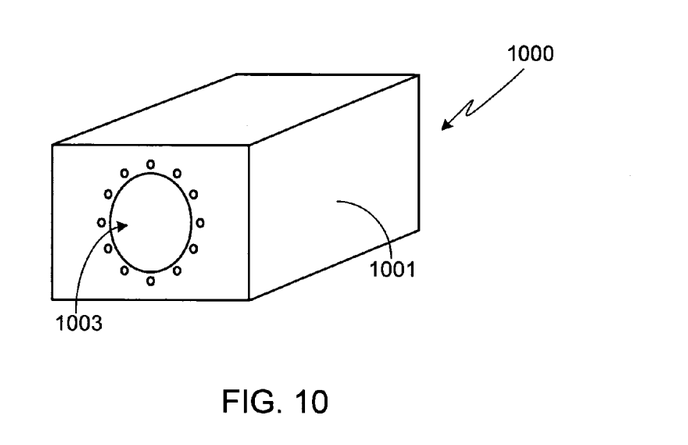
FIG. 10 is a perspective view of the external body portion of a cavitation chamber for use with the impeller shown in FIG. 8.

Although as previously noted the invention is not limited to a specific design for either the impeller(s) or the chamber, a preferred embodiment of the invention for use with a cylindrical chamber is shown in FIGS. 8-10. As shown in the cross-sectional view of FIG. 8 and the perspective view of FIG. 9, impeller 800 has a pair of impeller blades 801. Note that in FIG. 9, impeller 800 has been rotated to provide a clearer view of impeller blades 801. For applications in which stable on-axis bubbles are desired, preferably the outside diameter of impeller 800 is smaller than the inside diameter of the cavitation chamber by a sufficient amount to minimize wall turbulence that can be caused by rotating the impeller blades in near proximity to the cavity wall. For applications in which bubble clouds are desired, preferably impeller 800 utilizes thick impeller blades and the outside diameter of the impeller is only slightly smaller than the inside of the cavitation chamber, thereby maximizing wall turbulence.

For ease of fabrication, impeller 300 is fabricated from a cylinder. In one exemplary embodiment the cylinder is 7 inches long with an outside diameter of 2.5 inches and a wall thickness of 0.0625 inches. Preferably impeller 800 is fabricated from a metal such as stainless steel. During impeller fabrication, most of the wall of the cylinder is machined away, leaving only blades 801 and a portion 803 of the cylinder at either end. Cylinder end caps 805 and 806 are attached to end portions 803 using any of a variety of means, including but not limited to press-fitting, bonding, brazing or bolting the pieces together. As shown in further detail below, end cap 806 includes a spindle 807 which confines the axis of rotation of the impeller along the centerline of the chamber. End cap 805 includes a drive shaft 809, the drive shaft providing a means for coupling impeller 800 to a motor (not shown). Although the invention does not require that impeller 800 use two blades 801 as shown, the inventor has found that two blades provide sufficient fluid rotation capabilities while also providing a strong mechanical design. Other impeller configurations, however, are clearly envisioned (e.g., three blades, four blades, etc.). The primary requirements placed on the number and locations of the impeller blades are (i) balanced and stable operation during rotation and (ii) minimization of impeller created turbulence.

FIG. 10 is a perspective view of the external body portion of a cavitation chamber 1000 for use with impeller 800. To simplify fabrication, chamber 1000 is fabricated from a single piece of material 1001, preferably stainless steel. A cylindrical hole 1003 is bored into block 1001 such that impeller 800 fits within the hole as shown in the chamber cross-sectional view of FIG. 11. Assuming an impeller with an outside diameter of 2.5 inches, preferably the inside diameter of the cavitation cavity (i.e., hole 1003) is 3.0 inches. Although hole 1003 need not be bored completely through block 1001 as shown, the inventor has found that chamber assembly and maintenance is simplified by doing so. Accordingly the preferred embodiment of the invention uses a pair of end caps 1103/1105 to seal chamber 1000, the end caps preferably bolted to block 1001 with a plurality of bolts 1107 and sealed with one or more sealing members 1109 (e.g., o-rings). End cap 1103 includes one or more bearings 1111 to insure proper rotation of impeller spindle 1107, and thus impeller 800. End cap 1105 preferably includes at least one bearing 1113 and multiple seals 1115. A secondary end cap 1117 with sealing members 1119 (e.g., o-rings) may be used, as shown, to hold seals 1115 and bearings 1113 in place and to provide additional sealing of the chamber. Preferably multiple Teflon o-rings 1121 are inset into both end caps 1103/1105 as shown, o-rings 1121 helping to seal chamber 1100 as well as providing a low friction surface between the impeller end caps and the chamber end caps.

Figure 11:
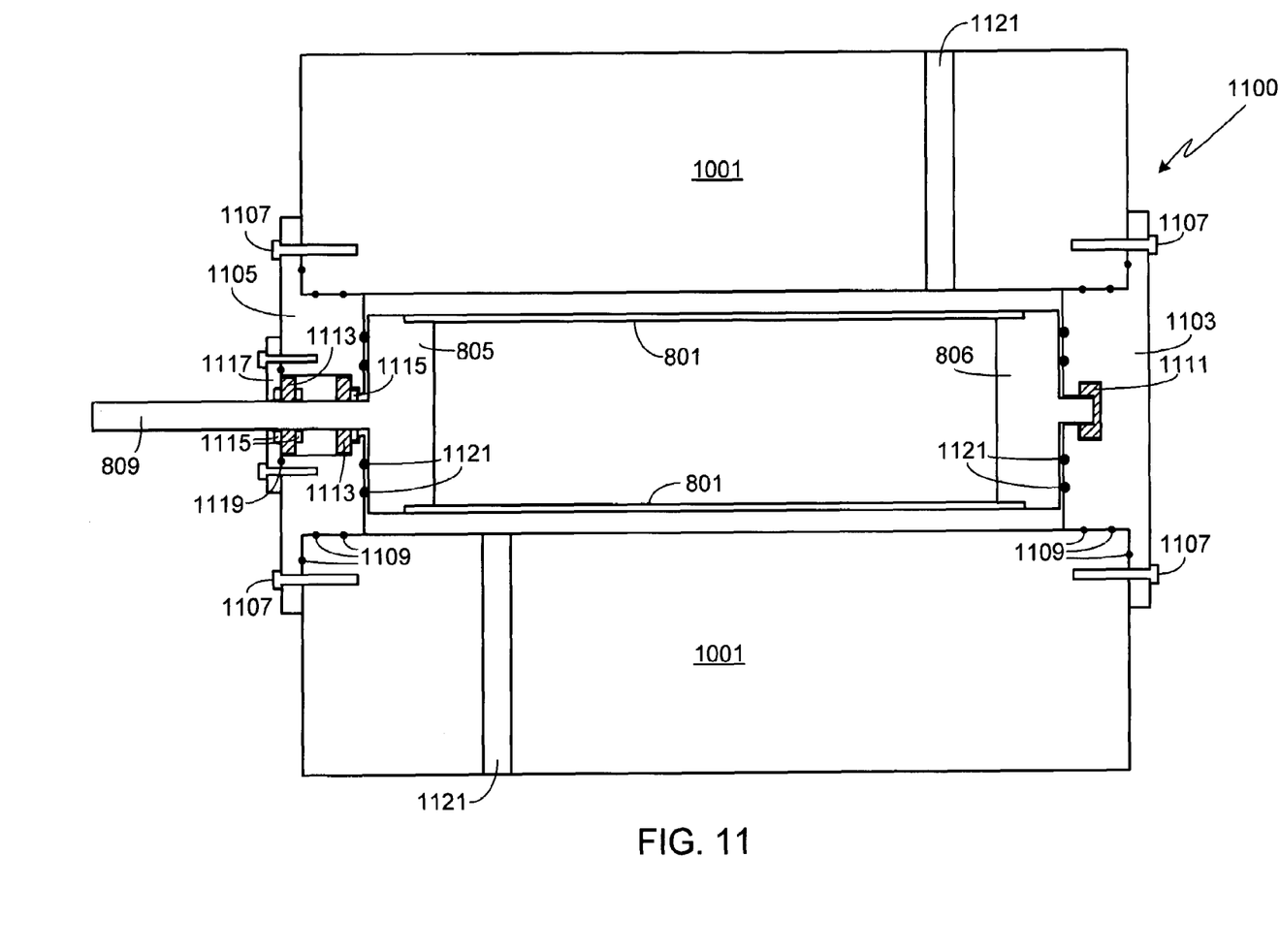
FIG. 11 is a cross-sectional view of the chamber shown in FIG. 10.

The sealing members (i.e., seals 1109, 1115, 1119 and 1121) are designed to insure that cavitation chamber 1100 can be either evacuated, preferably to a pressure of less than the vapor pressure of the cavitation fluid, or pressurized, preferably to a pressure of at least 1,000 PSI, more preferably to a pressure of at least 10,000 PSI, and still more preferably to a pressure of at least 100,000 PSI. Thus the sealing members are designed to allow the chamber to be either evacuated for degassing or pressurized during operation. It will be appreciated that the invention is not limited to a particular seal arrangement and that there are numerous means for adequately sealing chamber 1100. The exact nature of a particular seal depends on whether the surfaces to be sealed are static, such as end cap 1105 and chamber body 1001, or dynamic, such as drive shaft 809 and end cap 1105. Depending upon the intended cavitation medium as well as the desired pressure ranges, a variety of sealing member types can be used with the invention including, but not limited to, o-rings, static packing seals such as gaskets and dynamic packing seals such as flanges, rings, and adjustable soft packings.

Preferably chamber 1100 also includes a pair of chamber inlets 1121, thus allowing the chamber to be filled, drained and/or coupled to a cavitation fluid circulatory system as described in detail in co-pending application Ser. No. 11/001,720, the disclosure of which is incorporated herein for any and all purposes.

The embodiment shown in FIGS. 8-11 is only meant to illustrate one preferred implementation of the invention. It will be appreciated that the invention is not limited to a particular impeller design, chamber shape, cavitation system, impeller sealing means, impeller driving means, etc. Nor does the invention require that the shape of the impeller assembly match that of the cavitation chamber. Thus, for example, a cylindrical impeller can be used with a spherical or rectangular chamber.

Figure 12:
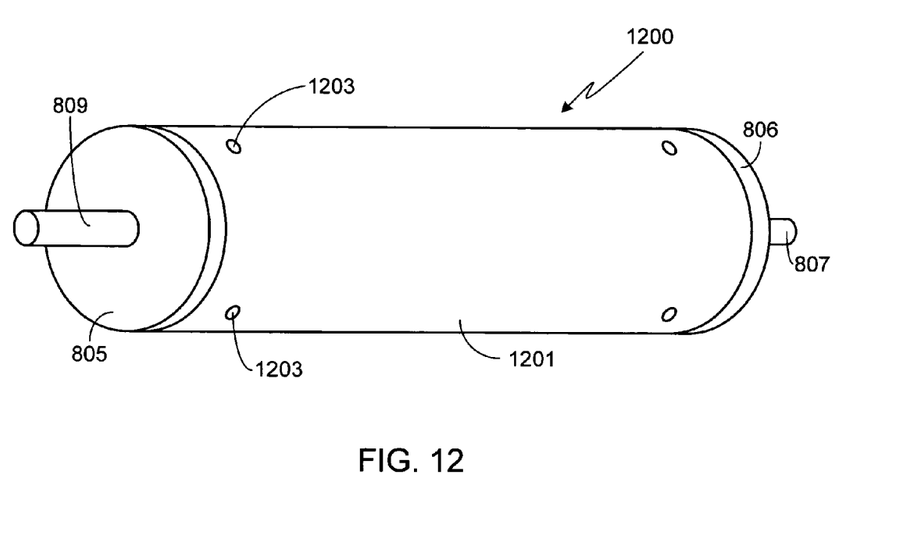
FIG. 12 is a perspective view of a cylindrical bladeless impeller.

FIG. 12 illustrates an impeller 1200 that uses a single cylindrical impeller blade 1201, impeller 1200 suited for cavitation chambers utilizing acoustic drivers. Cylindrical impeller blade 1201 is fabricated from a cylinder and attached to end caps 805/806 as previously described. Preferably impeller blade 1201 includes a plurality of small holes 1203 which allow pressure equalization and fluid flow between the inside and the outside of impeller 1200 (i.e., within chamber 1000). Preferably holes 1203 are located near the edges of impeller cylinder 1201, thus minimizing turbulence within the central region of the chamber. Although holes 1203 can be bored into one or both end caps 805/806, typically such a configuration results in greater turbulence. The major benefit of a cylindrical impeller such as impeller 1200 over a multi-bladed impeller such as impeller 800 is that the cylindrical impeller does not create as much turbulence within the cavitation medium since it does not have one or more blade edges which must slice through the cavitation medium during rotation.

Figure 13:
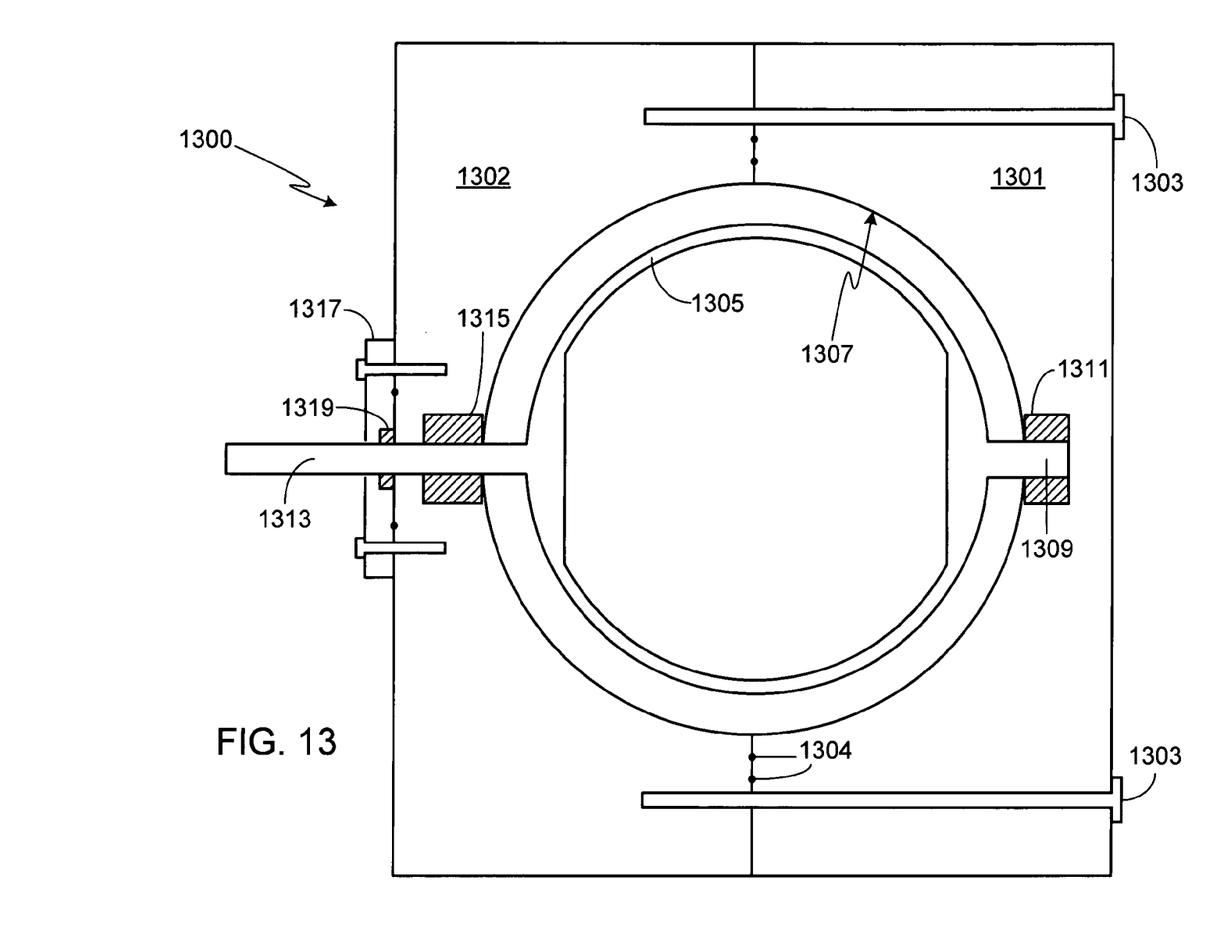
FIG. 13 is a cross-sectional view of another embodiment of the invention in which the cylindrical cavity of FIG. 11 is replaced with a spherical cavity.

FIG. 13 is a cross-sectional view of another embodiment of the invention. This embodiment is similar to that shown in FIGS. 8-11, but the cylindrical chamber cavity is replaced with a spherical cavity. In this embodiment, chamber 1300 is comprised of two pieces 1301/1302 that are bolted together with a plurality of bolts 1303 to form the chamber. At least one sealing member 1304 (e.g., o-ring, gasket, etc.) seals portion 1301 to portion 1302. Prior to assembling portions 1301/1302, impeller 1305 is located within the spherical cavity 1307 such that spindle 1309 is fitted within bearing 1311. Spindle drive shaft 1313 is fitted through a seal/bearing housing 1315 incorporated within chamber portion 1302. Preferably an end cap 1317 is bolted to chamber portion 1302, end cap 1317 including an additional sealing member 1319. As previously noted, preferably the chamber includes a pair of chamber inlets (not shown), thus allowing the chamber to be filled, drained and/or coupled to a cavitation fluid circulatory system. Impeller 1305 preferably includes at least 2 blades. As previously noted, if acoustic drivers are used with chamber 1300, impeller 1305 can utilize a solid or bladeless impeller design, thus minimizing impeller induced turbulence. If a bladeless impeller is used, preferably it includes a plurality of holes near the spindle shaft ends of the impeller, thus allowing fluid to flow between the inside and outside of the impeller.

Figure 14:
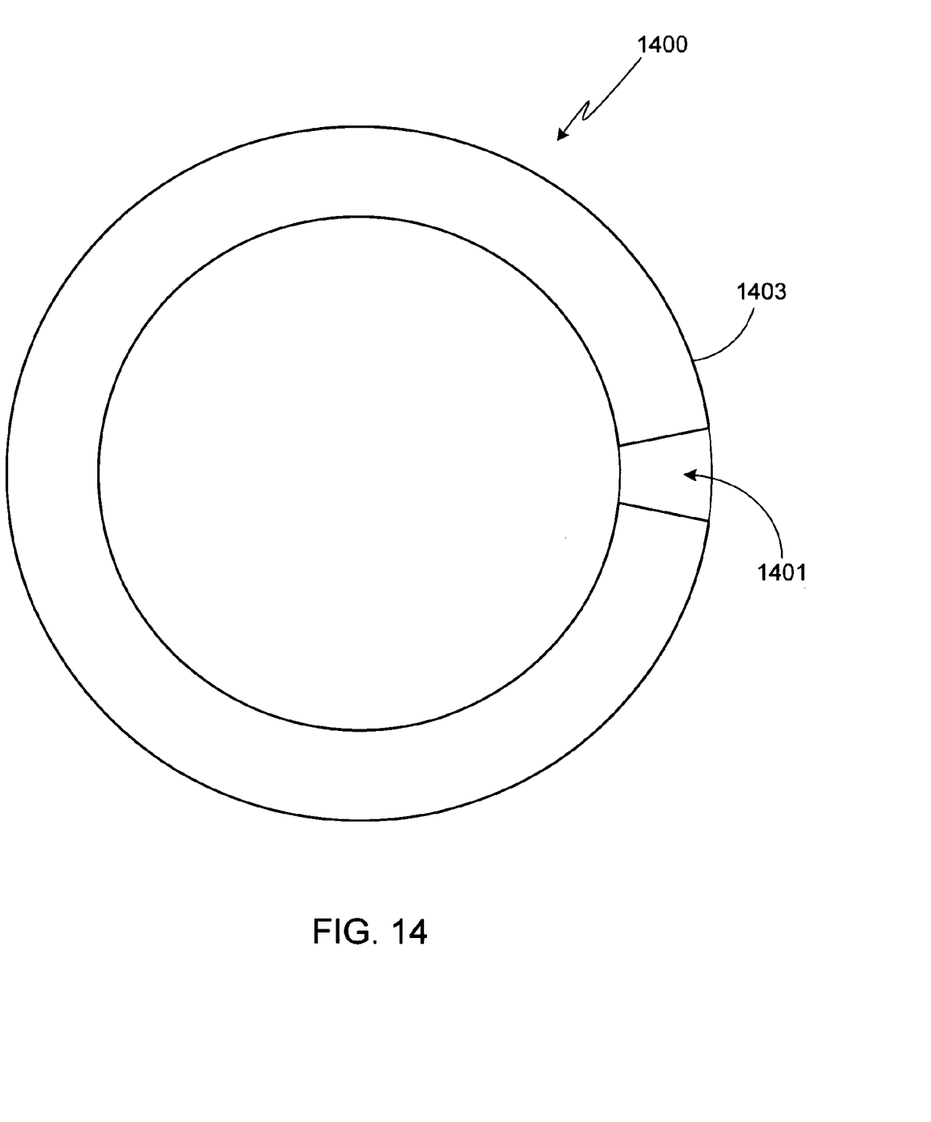
FIG. 14 is an illustration of a spherical cavity that cannot be disassembled.
Figure 15:
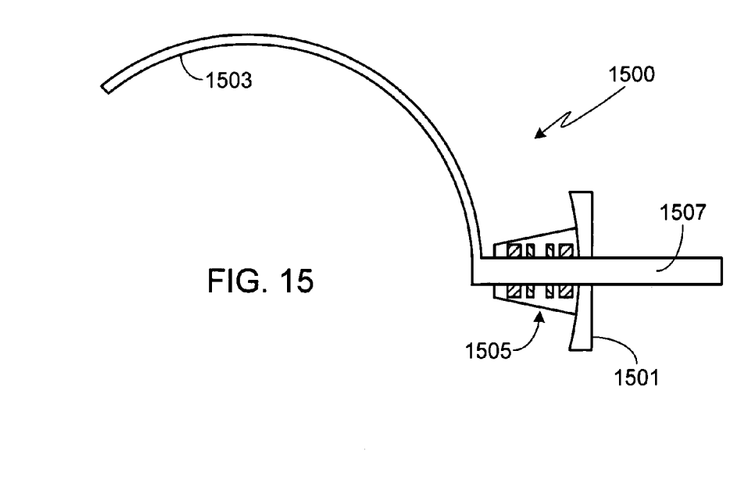
FIG. 15 is a side view of a single-bladed impeller for use with the spherical cavitation chamber of FIG. 14.
Figure 16:
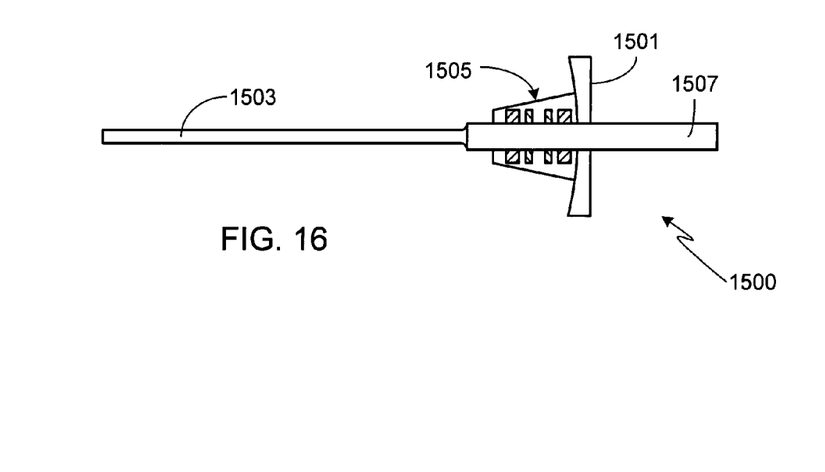
FIG. 16 is a top view of the single-bladed impeller of FIG. 15.
Figure 17:
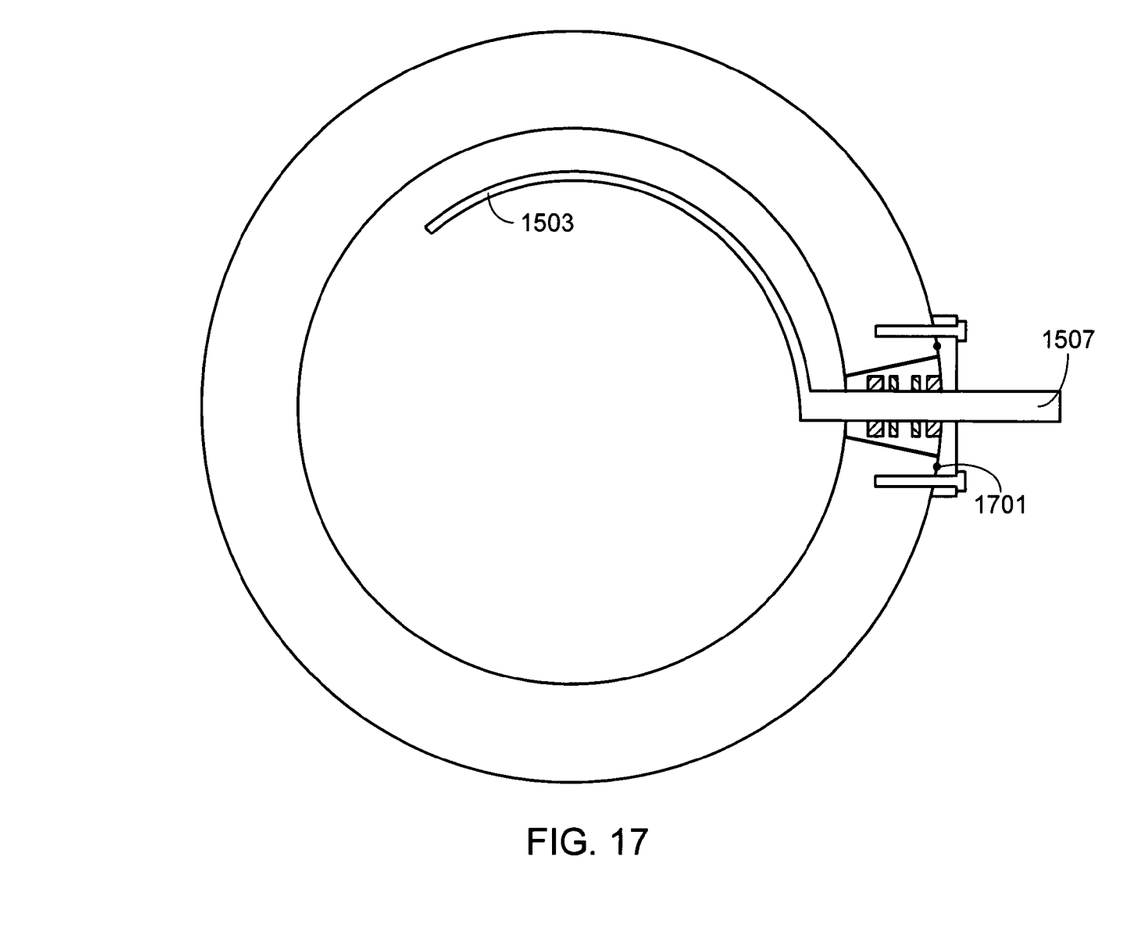
FIG. 17 is a cross-sectional view of the spherical cavity of FIG. 14 with the impeller assembly of FIG. 15 installed.

The present invention is not limited to cavitation chambers that can be assembled around the impeller. For example, FIG. 14 is an illustration of a spherical cavitation chamber 1400 which is fabricated in such a way as to preclude disassembly. One technique for fabricating such a chamber is disclosed in co-pending application Ser. No. 10/925,070, filed Aug. 23, 2004, entitled *Method of Fabricating a Spherical Cavitation Chamber*. An impeller assembly 1500 such as that shown in FIGS. 15 and 16 can be inserted through port 1401 and then sealed to chamber exterior surface 1403 with a flange 1501 and one or more sealing members 1701 (e.g., o-rings, gaskets, etc.). In addition to flange 1501, impeller assembly 1500 includes an impeller blade 903, a sealing/bearing assembly 1505, and a drive shaft 1507 to be coupled to a drive motor (not shown). FIG. 17 is an illustration of impeller assembly 1500 sealed to chamber 1400.

Figure 18:
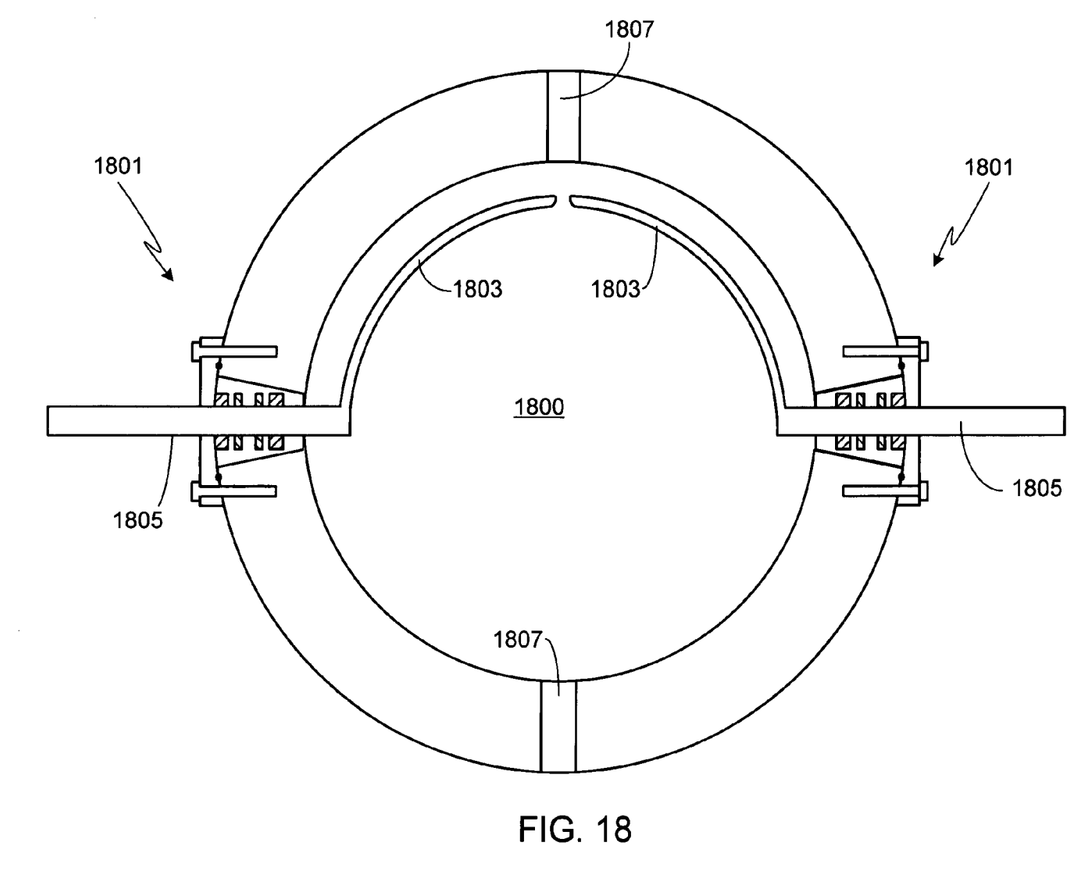
FIG. 18 is a cross-sectional view of a spherical cavity similar to that shown in FIG. 14 with a pair of impeller assemblies similar to the assembly shown in FIGS. 15 and 16.

FIG. 18 is a cross-sectional view of a spherical cavitation chamber 1800 similar to that shown in FIG. 14, except that the chamber has two ports for use with two impeller assemblies 1801. The impeller blade 1803 for each assembly 1801 is short enough to insure that the two blades will not interfere with one another during operation. In a preferred embodiment, each drive shaft 1805 includes a timing mark so that the location of each blade within chamber 1800 can be determined, thus allowing the timing of the two impellers to be synchronized (i.e., turning at the same rate and within the same plane within the chamber). Chamber 1800 also includes a pair of inlets 1807 for use in filling or draining the system, or for use with a cavitation fluid circulatory system.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A cavitation system comprising: a cavitation chamber; an impeller assembly located within said cavitation chamber, wherein rotation of said impeller assembly affects a position of a bubble within a cavitation medium contained within said cavitation chamber; a drive shaft coupled to said impeller assembly, said drive shaft having a first portion within said cavitation chamber and a second portion outside of said cavitation chamber; a motor coupled to said second portion of said drive shaft for rotating said impeller assembly; and at least one cavitation driver coupled to said cavitation chamber, wherein said cavitation chamber is a spherical cavitation chamber, and, wherein said impeller assembly further comprises: a spherical impeller; a first end portion; and a second end portion, wherein said drive shaft is coupled to said second end portion.

2. The cavitation system of claim 1, wherein said spherical impeller comprises at least two impeller blades.

3. A cavitation system comprising: a cavitation chamber; an impeller assembly located within said cavitation chamber, wherein rotation of said impeller assembly affects a position of a bubble within a cavitation medium contained within said cavitation chamber; a drive shaft coupled to said impeller assembly, said drive shaft having a first portion within said cavitation chamber and a second portion outside of said cavitation chamber; a motor coupled to said second portion of said drive shaft for rotating said impeller assembly; and at least one cavitation driver coupled to said cavitation chamber wherein said impeller assembly further comprises: a cylindrical impeller; a first end portion; and a second end portion, wherein said drive shaft is coupled to said second end portion.

4. The cavitation system of claim 3, wherein said cylindrical impeller comprises at least two impeller blades.

* * * * *